Figure 1:
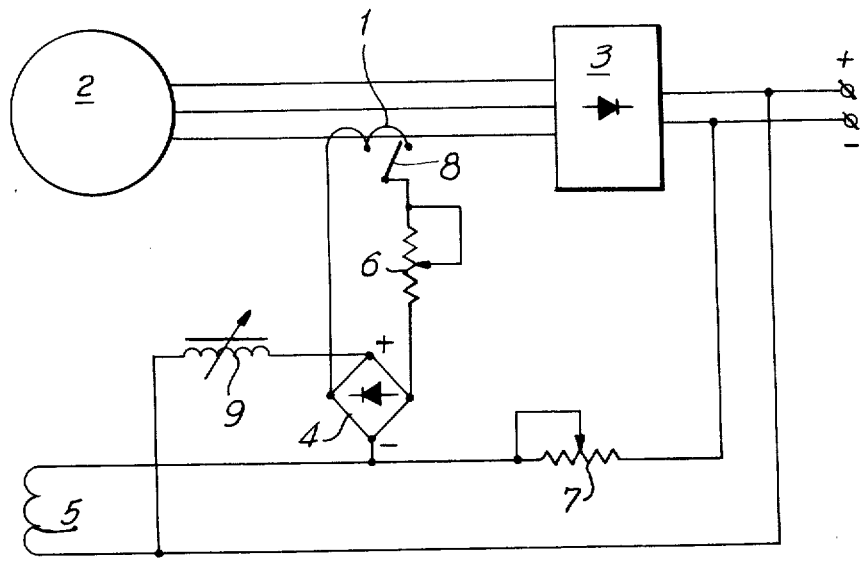

United States Patent
Dirzhis et al.

[11] 3,916,292
[45] Oct. 28, 1975

[54] EXCITATION SYSTEM FOR A WELDING CURRENT GENERATOR, PARTICULARLY OF A SEMI-CONDUCTOR POWER DIODE TYPE

[76] Inventors: Sauljus Antano Dirzhis, ul. Karolio Pozhelos, 13, kv. 16, Vilnjus; Nikolai Alexeevich Panfilov, ul. Sheremetevskaya, 81a, kv. 7, Moscow; Mark Isakovich Vidomsky, ul. Basanavichaus, 17, kv. 20, Vilnjus, all of U.S.S.R.

[22] Filed: Sept. 27, 1973

[21] Appl. No.: 401,433

Related U.S. Application Data

[63] Continuation of Ser. No. 174,180, Aug. 23, 1971, abandoned.

[52] U.S. Cl. .................. 322/25; 322/27; 322/76
[51] Int. Cl.² .................. H02P 9/38; H02P 9/10
[58] Field of Search ............ 322/25, 26, 27, 28, 75, 322/76, 80; 219/108, 109, 131, 133, 132

[56] References Cited
UNITED STATES PATENTS

| | | | |
|---|---|---|---|
| 2,862,173 | 11/1958 | Bobo et al. | 322/25 |
| 3,369,171 | 2/1968 | Lane | 322/25 X |
| 3,829,652 | 8/1974 | Terry | 322/25 X |

*Primary Examiner*—J. D. Miller
*Assistant Examiner*—Robert J. Hickey
*Attorney, Agent, or Firm*—Haseltine, Lake & Waters

[57] ABSTRACT

An excitation system for a welding current generator, particularly, of a semi-conductor power diode type, adapted to be employed with generators characterized by a relatively great internal electric resistance, this system providing for controlling the steepness of the output volt-ampere characteristics of the generator, with the value of the idle voltage remaining constant. When the current values are comparatively low, the even system even provides for increasing the value of the idle voltages. The system also makes it possible to introduce remote control of the welding current. The generator has an output circuit connected to a power rectifier which in turn is connected to the excitation circuit of the generator. The output circuit is further connected through one or more transformers to the excitation circuit through a rectifier circuit including controls such as switches, adjustable resistors and/or adjustable inductances.

12 Claims, 2 Drawing Figures

EXCITATION SYSTEM FOR A WELDING CURRENT GENERATOR, PARTICULARLY OF A SEMI-CONDUCTOR POWER DIODE TYPE

CROSS-REFERENCE TO RELATED APPLICATION

This application is a continuation of application Ser. No. 174,180 filed Aug. 23, 1971, now abandoned.

The present invention relates to excitation systems for electric generators having a comparatively great value of internal inductive reactance, and more particularly to excitation systems which can be employed in alternating-current welding generators, as well as in generators including rectifying means.

Known in the art is an excitation system, for example for a synchronous generator, comprising a voltage transformer having the primary winding thereof connected to either the line or phase voltage of the generator, and a current transformer having the primary winding thereof connected in series with one of the phases of the generator. The secondary windings of these two transformers are adapted to supply electric current to either the excitation winding of the generator or the winding of a separate excitation device thereof (see, for example, "Self-Excitation Synchronous Generators" by E. Y. Yakubaitis, Publishing House of the Academy of Science of the Lithuanian Soviet Socialist Republic, 1959).

The above-mentioned excitation systems for synchronous generators are both bulky in size and of a complicated structure. Besides, they do not provide for obtaining a series of output volt-ampere characteristics having different steepness, which is essential for controlling the output current of a welding generator. Consequently, those systems have found but a limited application.

Prior to the present invention, excitation of welding current generators has been accomplished either by means of an external source or by means of an additional winding carried by the armature of the generator, or else by means of permanent magnets.

With these excitation systems of the prior art, when the output current of the generator was being adjusted, the idle voltage value also varied, which is a feature quite inappropriate for a welding generator. Moreover, with these excitation systems for welding generators constructed in accordance with the prior art, establishing remote control of the welding current presented certain difficulties.

It is an object of the present invention to eliminate these disadvantages.

Another object of the present invention is to provide an excitation system for a welding generator, particularly for a welding generator including semi-conductor power diodes, which provides for adjusting selectively the steepness of the output volt-ampere characteristics of the generator, while maintaining the value of the idle voltage thereof at a constant level, and which should even be capable, in the case of comparatively low current values, of increasing the idle voltage value should such need arise.

The above and further objects are accomplished by the provision of an excitation system for a welding current generator comprising at least one transformer having the primary winding thereof connected into the power circuit of said generator, the second winding of said transformer being adapted to supply electric voltage through a rectifying device either to the excitation winding of said generator or to the excitation winding or an external excitation device of said generator, this system, in accordance with the present invention, having the circuit of said secondary winding of said transformer including a current control device, whereby the electric current flowing through said secondary winding can be selectively controlled.

This control device in an excitation system, embodying the present invention, may include either a plurality of variable resistors, or a selector switch adapted to control the transformation ratio of said transformer, or both.

It is preferred, in order to speed up the process of restoration of a desired value of the idle voltage at transition periods from short-circuiting to idle operation of said generator, for the direct-current circuit of said secondary winding of said transformer to include an inductance device.

An excitation system for a welding current generator, accomplished in accordance with the present invention, provides for attaining successfully the above-described aims and objects, and in addition, provides for easily establishing remote control of the welding current, as well as insuring a stable, elastic welding arc and reduces the waste of metal in the course of a welding operation.

Figure 2:
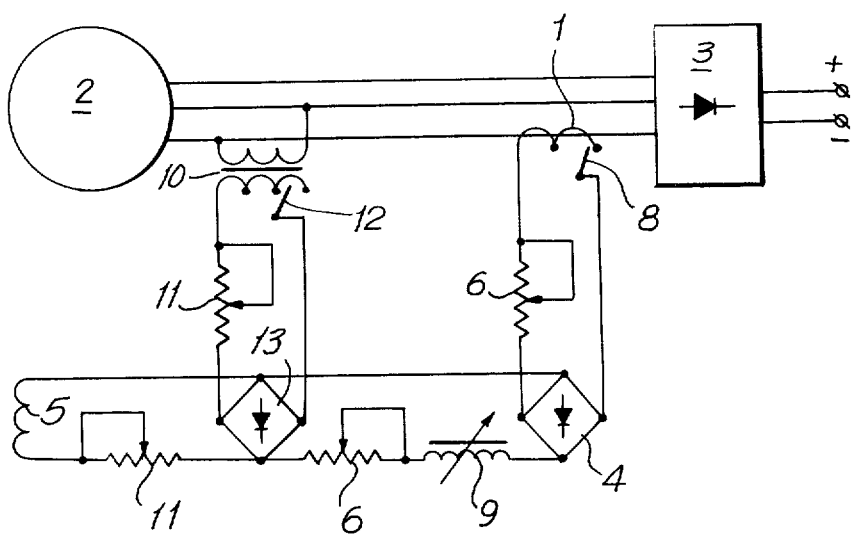

For a better understanding of the present invention, there follows hereinbelow a detailed description of two embodiments of an excitation system for a welding current generator, constructed in accordance with the characteristic features of the present invention, with due reference being had to the accompanying drawings, wherein:

FIG. 1 is a schematic circuit diagram of an excitation system for a welding current generator with a single transformer; and FIG. 2 is a schematic circuit diagram of an excitation system for a welding current generator with a plurality of transformers.

Referring now particularly to the appended drawings, FIG. 1 shows an excitation system for a welding current generator, including a transformer 1 having its primary winding connected in series with the power circuit, intermediate of the armature 2, the generator and the power rectifier 3. This primary winding of the transformer 1 may be connected either with the circuit of the armature 2, or with the phase thereof. The secondary winding of a transformer 1 is connected through a rectifier 4 to the excitation winding 5 of the generator. Alternatively, the secondary winding of the transformer 1 may be connected to the excitation winding of the excitation device of the generator. The excitation winding 5, in its turn, is connected to the output voltage terminals of the power rectifier 3. In accordance with a characteristic feature of the present invention, the supply circuit of the excitation winding 5 includes a pair of variable or adjustable resistors 6 and 7, a multi-position selector switch 8 and an inductance device 9 which may be either adjustable or of a constant magnitude.

According to a modification of the present invention, shown in FIG. 2, the excitation winding 5 may be supplied through a pair of transformers — the current transformer 10 and a voltage transformer 10. In this case, the circuit of the secondary winding of the voltage transformer 10 likewise includes an adjustable resistor 11, a selector switch 12 and a rectifier 13. Moreover, additional adjustable resistors 6' and 11' may be connected to the secondary windings, respectively, of the transformers 1 and 10, on the direct-current side thereof.

The operation of the excitation system for a welding transformer, shown in FIG. 1, is similar to the operation of the excitation system shown in FIG. 2. Therefore, for the sake of brevity, there will only be discussed in detail the operation of the excitation system shown in FIG. 2.

When the generator is started idle with any amount of residual magnetization present, the voltage transformer 10, according to the well-known self-excitation principle, beings to supply the excitation winding 5 with voltage, whereby the output voltage of the generator is built up to a desired idle voltage value.

In the case when the herein disclosed excitation system is constructed in accordance with the modification, shown in FIG. 1, self-excitation of the generator is due to rectified voltage of the output power circuit thereof. As load is connected to the generator, and the value of this load is increased, the voltage supplied from the transformer 10 (FIG. 2) to the excitation winding 5 through the rectifier 13 decreases, whereas the voltage supplied by the transformer 1 is built up. Control of the idle voltage value, as well as of the welding current value is performed by adjusting the resistors 11, 11', 6 and 6'. However, it is possible to do with but a single pair of resistors: either 6 or 6' plus either one of the pair 11 and 11'.

In order to attain a series of output characteristics of the generator, varying in the steepness of the curvature thereof, simultaneously maintaining a constant value of the idle voltage, it is sufficient to adjust solely either the resistor 6 or the resistor 6'. In this case, the resistor 11 or 11' should be of a constant value.

When both the value of the idle voltage of the generator and the steepness of its output characteristics are to be controlled, this can be also performed by adjusting the transformation ratio of the transformers 1 and 10 by means of varying correspondingly the working number of the turns of the secondary and primary windings of the respective transformers 1 and 10, by means of the selector switches 8 and 12. Moreover, variable resistors adapted to control the idle voltage value and the steepness of the output characteristics of the generator may be included in the direct current circuit of the system in the form of potentiometers.

It should be noted, however, that, in order to insure that both the idle voltage value and the steepness of the output characteristics of the generator might be controlled the controlling system may include both the number-of-turns selector switches and variable resistors.

The inductance device 9 wired into the rectified current line of the transformer 1 speeds up the process of restoring the desired idle voltage value at transition periods from short circuiting to idle operation.

The adjustable or variable resistors 6 and 6' may be mounted directly at the welding station, whereby remote control of the welding current of the generator is provided for.

What is claimed is:

1. Apparatus comprising a welding current generator, an excitation system for said welding current generator and including a power output circuit and an excitation circuit, said system comprising: rectifying means, at least one voltage transformer including a primary winding connected to the power output circuit of said generator and a secondary winding connected through said rectifying means directly to the excitation circuit of said generator in order to supply electric current thereto; control means connected in circuit with said secondary winding of said transformer, said control means being adapted to control the electric current flowing through said secondary winding, a current transformer including a primary coupled to said power output circuit and a secondary winding, and further rectifier means connecting the latter said secondary winding directly to said excitation circuit, said secondary windings being separated from each other by both said rectifier means, said secondary windings together with their respective rectifier means forming parallel circuits coupled to said excitation circuit and serving as the only source of supply thereof, said current transformer comprising a direct-current circuit coupled to said secondary winding thereof, said direct-current circuit including an inductance means being adapted to speed up the restoration of the voltage of said generator at transitions from the short-circuit condition thereof.

2. Apparatus according to claim 1, wherein said control means includes adjustable resistors connected to said secondary windings.

3. Apparatus according to claim 1, wherein said control means includes selector switch means electrically connected to said transformers, whereby the transformation ratios thereof may be adjusted selectively.

4. Apparatus according to claim 1, wherein said control means includes selector switch means and adjustable resistors coupled to each of said secondary windings.

5. Apparatus comprising a welding current generator including an excitation winding, an excitation system for the excitation winding of said welding current generator, said excitation system producing an alternating voltage and current used for feeding the excitation winding of said generator, said generator further including an output, said system comprising a voltage transformer, a rectifier connected via said voltage transformer to the output of the generator and being further connected to the excitation winding of the generator and constituting one excitation leg, a power circuit coupled to the output of said generator, a further rectifier, a current transformer including a primary winding connected to the power circuit and a secondary winding connected through said further rectifier and in parallel to the voltage transformer to the excitation winding of the generator thus providing a second leg of the excitation system, the two legs being connected in parallel and directly to said excitation winding in common and being the only source of supply thereof, an inductance means coupled to said further rectifier for accelerating voltage regeneration in the event of a sudden break of a short circuit of the generator.

6. Apparatus as claimed in claim 5 comprising control means in the legs of the excitation system for controlling the value of the open-circuit voltage and the slope of the output static volt-ampere characteristic.

7. Apparatus as claimed in claim 6 wherein said control means comprise resistors.

8. Apparatus as claimed in claim 6 wherein said control means comprise transformers having variable transformation ratios.

9. An excitation system for a welding generator including an excitation winding, said system comprising a generator power circuit, at least one transformer, the excitation winding of the generator being supplied from the generator power circuit by means of said transformer, rectifiers, a current and a voltage transformer including primary windings connected to the power circuit and secondary windings connected via said rectifiers to the excitation winding, and control means, the current in the excitation circuit being changed by said control means, said control means being connected to the secondary windings of the transformers and carrying excitation current, the primary winding of the current transformer being connected to the power circuit and the secondary winding being connected, via a rectifier, to the excitation winding, said system further comprising inductance means between the latter said rectifier and the excitation winding to speed up the regeneration of voltage during the transition of the generator from short-circuiting to idle operation.

10. An excitation system as claimed in claim 9, wherein the control means are controllable resistors carrying excitation current.

11. An excitation system as claimed in claim 9, wherein the control means are switches varying the transformation ratio of the transformers whose secondary windings carry excitation current.

12. An excitation system as claimed in claim 9, wherein the control means comprise a controllable resistor carrying excitation current and a switch varying the transformation ratio of a transformer whose secondary winding carries excitation current.

* * * * *